Patented May 26, 1925.

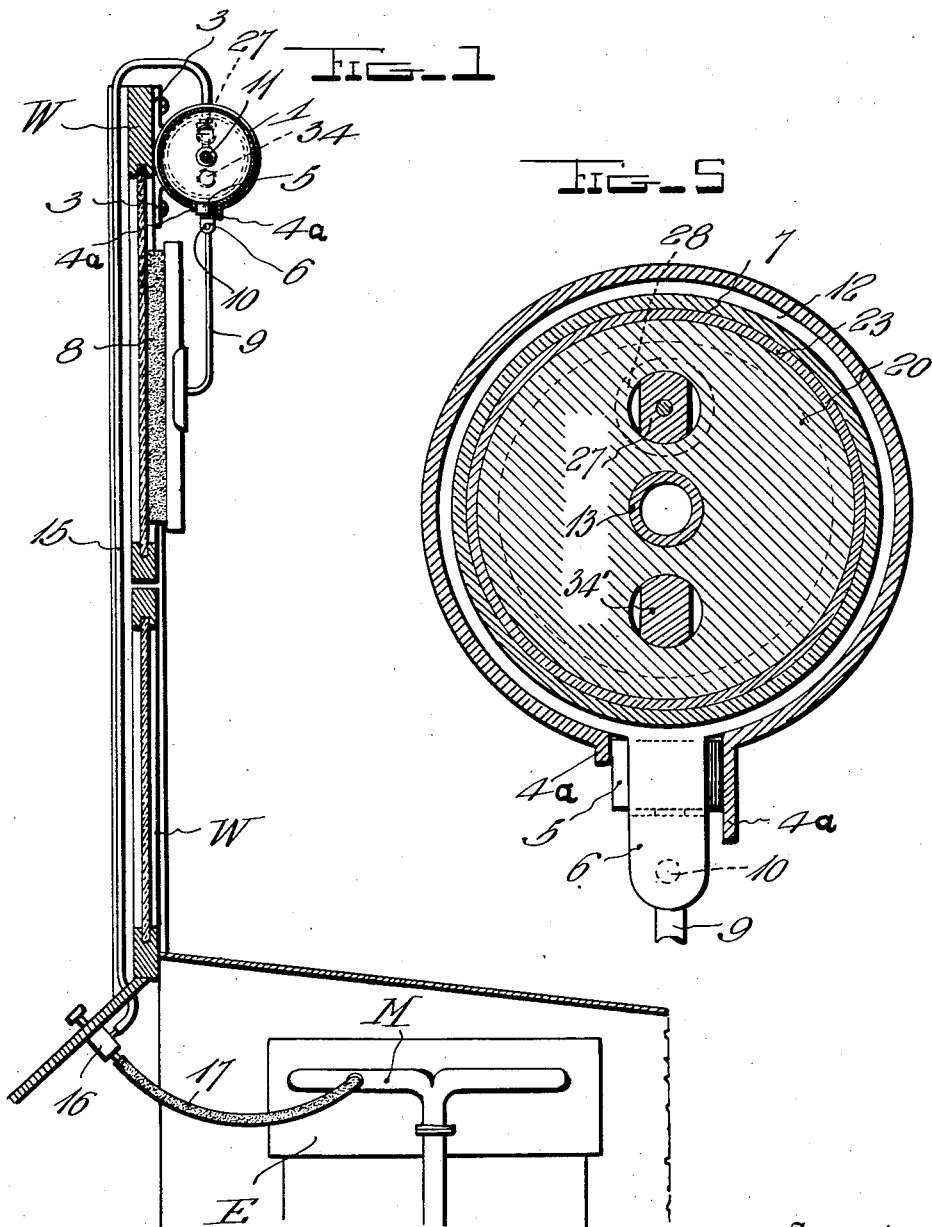

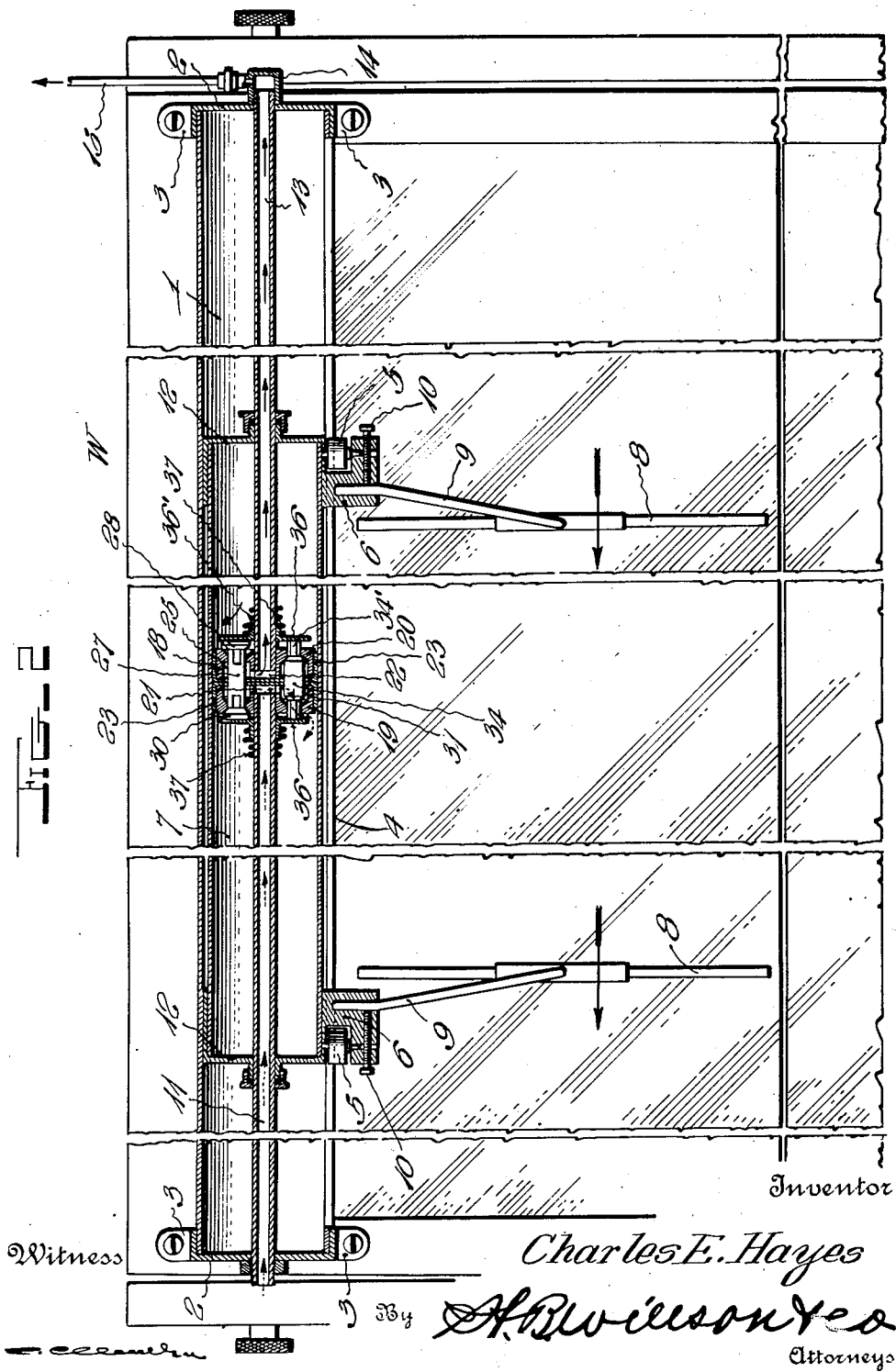

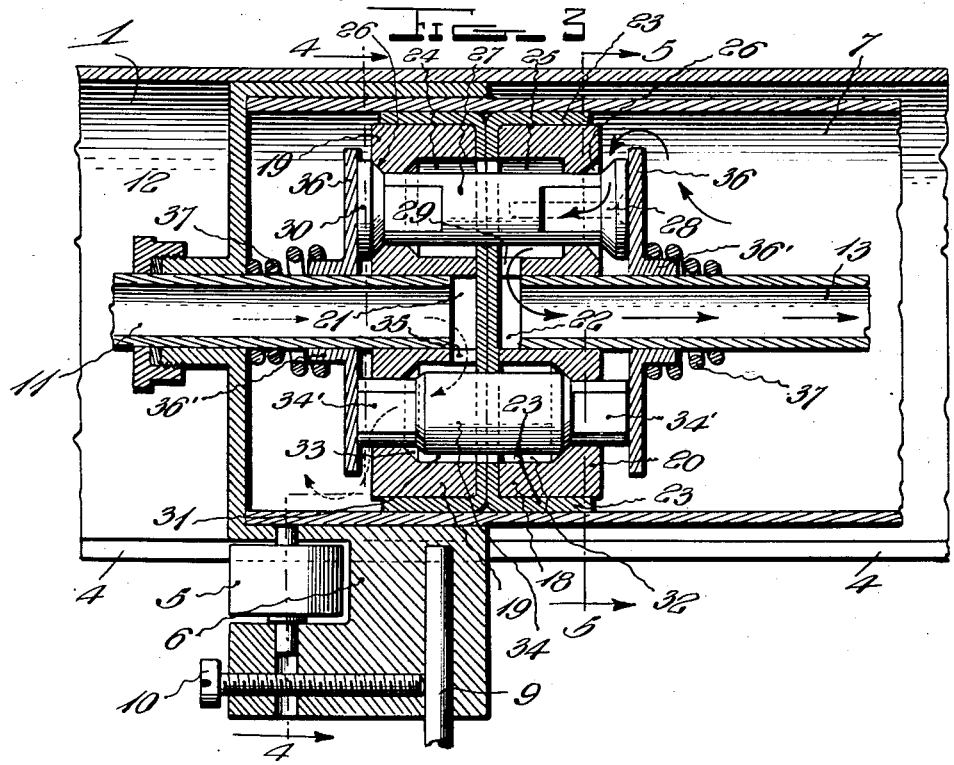

1,539,735

UNITED STATES PATENT OFFICE.

CHARLES EUGENE HAYES, OF DORCHESTER, MASSACHUSETTS.

WINDSHIELD WIPER.

Application filed March 30, 1922. Serial No. 548,021.

*To all whom it may concern:*

Be it known that I, CHARLES EUGENE HAYES, a citizen of the United States, residing at Dorchester, in the county of Suffolk and State of Massachusetts, have invented certain new and useful Improvements in Windshield Wipers; and I do declare the following to be a full, clear, and exact description of the invention, such as will enable others skilled in the art to which it appertains to make and use the same.

This invention relates to an improved windshield wiper and one object of the invention is to provide a wiper which may be actuated through being connected with the manifold of an internal combustion engine and will include a carrier which is movable transversely of the windshield to move wipers across the windshield, the carrier being preferably moved by suction set up in the manifold but so constructed that it may be actuated by pressure instead of suction.

Another object of the invention is to so construct this windshield wiper that the carrier may be in the form of a cylinder which is movable relative to a stationary block instead of having the wiper carried by a piston which moves longitudinally in a cylinder.

Another object of the invention is to provide this block with improved valve mechanism which will be moved to permit air to be drawn out of or forced into one end of the cylinder to impart movement to the cylinder by vacuum or pressure and at the same time permit atmospheric air to enter or leave the other end of the cylinder according to the direction in which the cylinder is moving.

Another object of the invention is to so mount and construct the valve actuating means that the valve actuating means may be mounted upon air pipes which extend through the cylinder and be frictionally held in set positions and moved to adjust the valve mechanism through engagement by the ends of the cylinder.

Another object of the invention is to so construct this windshield wiper that it may be readily associated with windshields of a conventional structure and to further so construct it that operation of the wiper may be controlled by the operator of the car.

This invention is illustrated in the accompanying drawings, wherein:

Figure 1 is a view partially in side elevation and partially in vertical section and showing the windshield wiper applied to a car.

Figure 2 is a view showing the structure of Fig. 1 with the windshield shown in elevation and the wiper shown in longitudinal section.

Figure 3 is an enlarged fragmentary longitudinal sectional view through the wiper.

Figure 4 is a sectional view taken along the line 4—4 of Fig. 3.

Figure 5 is a sectional view taken along the line 5—5 of Fig. 3.

This windshield wiper is provided with a tubular casing 1 which has heads 2 at its ends provided with seats 3 through which fasteners pass so that the casing may be secured to the windshield W with the casing extending transversely of the windshield adjacent the upper end thereof. This casing is provided with a longitudinally extending slot 4 from which extend depending lips 4ª forming guides or track elements between which are positioned rollers 5 carried by the depending arms 6 of a cylinder 7 which is positioned in and movable longitudinally of the casing 1. The wipers 8 extend vertically and are provided with upwardly extending stems 9 which extend into the arms 6 and are engaged by set-screws 10 so that they may be securely held in place but removed when desired. A pipe 11 which communicates with the atmosphere extends into the casing 1 through one of the heads 2 and also extends into the cylinder 7 through one of the heads 12 of this cylinder. The pipe 13 which extends through the second head of the casing and into the cylinder through the head at the opposite end thereof has its outer end provided with a cap 14 which is in the nature of a coupling elbow and is connected with a pipe 15 which is connected with a valve 16 secured to the instrument board where it may be readily reached by the operator of the car. This control-valve 16 is connected with the pipe 15 and with a pipe 17 which extends to and communicates with the inlet manifold M of the engine E. It will thus be seen that when the valve 16 is opened, communication will be established between the pipes 15 and 17 and when the engine is in operation, suction will be created through the pipes 17, 15 and 13. Of course, if the pipe 17 communicates with the exhaust manifold instead of the inlet manifold, pressure will be created in the pipes 13, 15 and 17 when the motor is in operation instead of suction. In order to cause sliding movement of the cylinder within the casing when the valve 16 is opened, there has been provided a piston head 18 which is stationary in the cylinder and connected with the inner ends of the pipes 11 and 13. This piston head 18 separates the cylinder into end compartments and is provided with valves which are so constructed and mounted that they may be moved to selectively establish communication between the pipe 13 and one end portion of the cylinder and at the same time cause the pipe 11 to have communication with the opposite end portion of the cylinder.

This piston head 18 is clearly illustrated in Fig. 3 and referring to this figure, it will be seen that the head is provided with end blocks 19 and 20 which are provided with centrally located pockets 21 and 22 to receive the pipes 11 and 13. Packing disks 23 are clamped between these blocks 19 and 20 and have their portions which extend beyond the blocks folded to extend in opposite directions between the blocks and the walls of the cylinder and thus prevent leakage past the blocks. It should be further noted that these disks provide a partition between the pockets 21 and 22 so that communication cannot be established between the pipe 11 and the pipe 13. Opposed pockets 24 and 25 are formed in the piston head 18 and 20 and each is provided with a restricted neck having a valve seat 26 at its outer end. It will thus be seen that when the plunger valve 27 is in the position shown in Fig. 3 with its head 28 off of its seat, air may be drawn from the cylinder as shown by the arrows with the air passing into the pocket 25 and through the ports 29 into the pocket 22 from which it will pass into the pipe 13. When however the valve 27 is moved to bring the head 28 into engagement with its seat and move the head 30 off of its seat, the air will be drawn from the opposite end of the cylinder into the pocket 24 and from this pocket through the pocket 25 and from this pocket 25 through the port 29 and through the pocket 22 into the pipe 13. The blocks are further provided with opposed pockets 31 and 32 each of which is provided with a reduced neck having a valve seat 33 at its inner end so that when the valve 34 is in the position shown in Fig. 3 air may pass from the outer atmosphere through the pipe 11 into the pocket 21 and into the pocket 31 through the port 35 and then into the end portion of the cylinder. The end portions 34' of this valve 34 are formed into necks which extend beyond the outer faces of the blocks so that this valve may be readily moved to an adjusted position. When the valve is moved to engage the valve seat of the pocket 31, the air from the pipe 11 after entering the pocket 31 will pass into the pocket 32 and into the other end portion of the cylinder. It will thus be seen that these valves are so constructed that when moved in a common direction, air will be permitted of being drawn out of one end portion of the cylinder and fed into the other end portion. Withdrawing of air from one end portion of the cylinder will form a partial vacuum therein and this will tend to impart sliding movement to the cylinder. As this cylinder moves longitudinally under the action of this vacuum it would have a tendency to form a partial vacuum upon the opposite side of the piston head 18 except for the fact that communication with the pipe 11 is established and therefore air and atmospheric pressure can feed into this end portion of the cylinder through the pipe 11. Disks 36 are slidably mounted upon the pipes 11 and 13 and are provided with hub portions 36' engaged by springs 37 which grip the pipes 11 and 13 so that means will be provided to frictionally hold the disks against movement longitudinally of the pipes. These springs extend away from the disks so that they may be engaged by the heads 12 of the cylinder when the cylinder has approximately reached the end of its sliding movement in either direction. When the spring at either end of the piston head is engaged by a head of the cylinder, the disks will be moved to project the valves longitudinally and thus cause a reversal in the position of the valves and thereby cause the cylinder to reverse its direction of sliding.

When this windshield wiper is in use, it is installed as shown in Figs. 1 and 2 with the pipe 15 connected with the valve 16 and the pipe 17 which leads from the valve connected with the manifold of the motor so that during operation of the motor, a suction will be created in the pipe 13. When suction is caused in the pipe 13 by opening the valve 16 and the valves are in the position shown in Fig. 3, air will be drawn out of the cylinder 7 to the right of the piston head 18 which may be termed a stationary piston and the cylinder will move toward the left. At the same time, air will pass through the pipe 11 into the left-hand end portion of the cylinder thus retaining the air in the left-hand end portion of the cylinder at atmospheric pressure. When the head 12 at the right hand end of the cylinder strikes the springs 37, at the right-hand end of the stationary piston, the valve will be moved and seated towards the left thus causing the air to be drawn into the pipe 13 from the left-hand end of the cylinder and the air from the pipe 11 to pass into the cylinder at the right-hand side of the stationary piston. The cylinder will thus have a reciprocating movement and the wipers 8 will move across the windshield and keep the glass clear of snow or rain water. The driver of the car will thus have a clear space of glass to look through and can readily see to operate the car. If the pipe 17 is connected with the exhaust manifold instead of the intake manifold, the air will be forced through the pipe 13 and into the end portion with which communication is permitted by the valves and air upon the opposite side of the stationary piston will be forced out through the pipe 11. It will thus be seen that this device can operate either by suction or by pressure. There has thus been provided a windshield wiper which is very easy to install and which will be very efficient in operation. It will be further noted that a windshield wiper has been provided which can be readily taken apart for cleaning or repairing and also that this wiper is so constructed that the disks or plates 36 cannot readily move longitudinally of the pipes 11 and 13 and will therefore be firmly held in place and the valves cannot accidentally slip out of the proper position.

I claim:

1. A structure of the character described comprising a casing adapted to be connected with and to extend transversely across a windshield, said casing being provided in one side with a longitudinal slot, a cylinder slidable longitudinally in said casing and having arms extended through said slot to prevent rotation of the casing within the cylinder, a wiper carried by said arms, pipes extending through the ends of said casing and passing slidably through the ends of said cylinder to permit sliding of the cylinder on said pipes, one of said pipes being in communication with the atmosphere, a fluid supply conduit adapted for connection with the other pipe, a stationary piston in the cylinder connected with the inner end of the aforesaid pipe and dividing said cylinder into compartments, valves in the compartments for controlling communication between the pipes and said compartments, means slidably mounted on said pipes for alternately seating said valves, and spring means carried by said first named means and engaging the pipes to frictionally hold said means.

2. A structure of the character described including a cylinder, pipes extending into the cylinder through the ends thereof with the cylinder movable longitudinally of the pipes, a stationary piston carried by the inner ends of the pipes and having end blocks fitting upon the inner ends of the pipes and having alined pockets having reduced outer end portions communicating with the end portions of the cylinder and forming valve seats, each block having one of its pockets provided with a side port for establishing communication with said pipes, packing disks between said blocks and extending beyond the sides of the blocks and bent to extend between the piston and walls of the cylinder, said disks shutting off communication between said pipes and having openings registering with the pockets, valves sliding through said pockets into and out of engagement with the valve seats, and means actuated by the cylinder for moving the valves to adjusted positions.

3. The structure of claim 2 having one set of alined pockets provided with valve seats at the outer ends of their reduced outer end portions and the second set of pockets provided with valve seats at the inner ends of their reduced outer end portions, the valves being slidable through the pockets and one having valve heads at its outer ends and the other having reduced ends forming necks extending through the reduced ends of the pockets and valve faces at the inner ends of the necks, the heads of the first valve and necks of the second valve being engageable by the valve actuating means for moving the valves longitudinally to open and close the ends of the pockets.

4. A structure of the character specified comprising a casing a cylinder slidable in said casing, pipes extending through the ends of said casing and into the interior of said cylinder, the inner ends of said pipes being spaced apart, a stationary piston connected to said inner ends, valves for controlling the ports in said piston, and means for alternately closing and opening said valve, said means comprising disks slidably mounted upon the pipes and movable toward and from said piston, said disks having necks fitting slidably on said pipes, and coiled spring fitting upon the necks, and extending beyond the necks and connected with the pipes to frictionally grip the latter and to provide yieldable stops for said disks.

5. A structure of the character specified comprising a casing having a longitudinally disposed slot formed in one side, said slot being provided along its edges with longitudinally disposed guides, a cylinder slidable within said casing, arms carried by said cylinder and extending outwardly through the aforesaid slot, antifriction rollers carried by said arms and engageable with said guides, windshield wipers detachably connected with said arms and depending therefrom, a stationary piston head disposed within said cylinder, said head being provided with ports, valves for closing said ports, pipes extending through the ends of said casing and into said cylinder and connected with said piston head, said pipes being in communication with said ports and yieldable stops slidably mounted on said pipes and coacting with said valves for alternatively seating the same.

In testimony whereof I have hereunto set my hand.

CHARLES EUGENE HAYES.